(12) United States Patent
Sadhasivan et al.

(10) Patent No.: US 10,771,442 B2
(45) Date of Patent: *Sep. 8, 2020

(54) SYSTEM AND METHOD FOR AUTHENTICATING AND ENABLING AN ELECTRONIC DEVICE IN AN ELECTRONIC SYSTEM

(71) Applicant: Anvaya Solutions, Inc., Folsom, CA (US)

(72) Inventors: Sathyamurthi Sadhasivan, El Dorado Hills, CA (US); Shobha Rani Mallarapu, Folsom, CA (US); Srinivas Atluri, Folsom, CA (US)

(73) Assignee: ANVAYA SOLUTIONS, INC., Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,043

(22) Filed: Mar. 31, 2019

(65) Prior Publication Data

US 2019/0230071 A1 Jul. 25, 2019

Related U.S. Application Data

(63) Continuation of application No. 15/904,998, filed on Feb. 26, 2018, now Pat. No. 10,250,577, which is a (Continued)

(51) Int. Cl.
*H04L 9/32* (2006.01)
*H04L 29/06* (2006.01)
*G09C 1/00* (2006.01)

(52) U.S. Cl.
CPC ............. *H04L 63/06* (2013.01); *G09C 1/00* (2013.01); *H04L 9/3226* (2013.01); *H04L 2209/16* (2013.01)

(58) Field of Classification Search
CPC ... H04L 63/06; H04L 2209/16; H04L 9/0819; H04L 9/32; H04L 9/3226
(Continued)

(56) References Cited

U.S. PATENT DOCUMENTS 8,402,401 B2   3/2013   Chakraborty
8,516,269 B1 * 8/2013   Hamlet ................ G06F 21/445
                                          340/5.8
(Continued)

FOREIGN PATENT DOCUMENTS

WO   WO2014178889   6/2014

*Primary Examiner* — Samson B Lemma
(74) *Attorney, Agent, or Firm* — Jim H. Salter; Inventive Law Inc.

(57) ABSTRACT

A system and method for authenticating and enabling an electronic device in an electronic system are disclosed. A particular embodiment includes: an electronic system comprising: a protected device; a requesting device node, executing on a computing system, the requesting device node including: a device query data packet generator to generate a device query packet including data representing one or more identifiers of the protected device and a particular paired system; and an authentication key retriever to obtain an authentication key based on the device query data packet from an authentication provisioning node using an external data communication; and an obfuscation state machine of the particular paired system configured with a pre-defined quantity of state elements, a pre-defined quantity of the state elements being functional state elements, the obfuscation state machine being programmed with the authentication key to cause the obfuscation state machine to transition the protected device from an initial obfuscation state to a functional state.

18 Claims, 11 Drawing Sheets

Related U.S. Application Data continuation of application No. 15/615,273, filed on Jun. 6, 2017, now Pat. No. 9,906,507, which is a continuation of application No. 14/804,284, filed on Jul. 20, 2015, now Pat. No. 9,813,395, which is a continuation-in-part of application No. 14/716,861, filed on May 19, 2015, now Pat. No. 9,569,601.

(58) Field of Classification Search
USPC .................................................. 713/168, 180
See application file for complete search history.

(56) References Cited

U.S. PATENT DOCUMENTS

| | | | |
|---|---|---|---|
| 8,938,792 | B2 | 1/2015 | Koeberl |
| 9,037,895 | B2 * | 5/2015 | Sethumadhavan ..... G06F 21/76 |
| | | | 713/502 |
| 9,569,601 | B2 | 2/2017 | Sadhasivan |
| 9,589,159 | B2 * | 3/2017 | Vembu .................... G06F 21/72 |
| 9,813,395 | B2 | 11/2017 | Sadhasivan |
| 9,825,766 | B2 | 11/2017 | Sadhasivan |
| 9,906,507 | B2 | 2/2018 | Sadhasivan |
| 10,032,016 | B2 | 7/2018 | Sadhasivan |
| 10,129,037 | B2 | 11/2018 | Sadhasivan |
| 10,250,577 | B2 | 4/2019 | Sadhasivan |
| 2006/0209584 | A1 * | 9/2006 | Devadas ................. G06F 21/31 |
| | | | 365/52 |
| 2009/0271877 | A1 | 10/2009 | Bradley |
| 2010/0027790 | A1 | 2/2010 | Vembu |
| 2010/0127822 | A1 * | 5/2010 | Devadas ............... H04L 9/3278 |
| | | | 340/5.8 |
| 2010/0332852 | A1 | 12/2010 | Vembu |
| 2011/0113392 | A1 | 5/2011 | Chakraborty |
| 2011/0167272 | A1 * | 7/2011 | Kolesnikov ........... H04L 9/3242 |
| | | | 713/171 |
| 2012/0124393 | A1 | 5/2012 | Sethumadhavan |
| 2013/0346928 | A1 | 12/2013 | Li |
| 2017/0272414 | A1 | 9/2017 | Sadhasivan |
| 2018/0307827 | A1 | 10/2018 | Sadhasivan |

* cited by examiner

Device Query Packet (128 Bits): Device User reads the value from the Device and sends the value to the IP Owner. The value can be encrypted with PKI or other encryption methods. Data fields of the value prior to encryption are shown below:

| Device based 96 bit Random Number Generated Nonce Value | 31 Bit Device Wake-up Obfuscation State | 1 Bit |
|---|---|---|

Authentication_Done Indicator (from Device internal "Valid Authentication Key Programmed" flag)

Authentication Key (128 Bits): Sent from the IP Owner to the Device User. The value can be encrypted prior to transmission. Data fields of the key prior to encryption are shown below:

| Device based 96 bit Random Number Generated Nonce Value | X Bits of Authorization Code | 32 - X Bits of Clock Cycle Count |
|---|---|---|

Number of Clock Cycles to be used to reach the Functional State. The number can be expressed as a power of 2, but cannot represent a value less than 256 (Default)

Authentication Exchange Information Data Structures

Fig. 9

Processing Logic for Authenticating and Enabling
an Electronic Device in an Electronic System
-1150-

Provide a protected device.
-1160-

Generate a device query packet including data representing one or more identifiers of the protected device and a particular paired system.
-1162-

Obtain an authentication key based on the device query data packet from an authentication provisioning node using an external data communication.
-1164-

Program an obfuscation state machine of the particular paired system with the authentication key to cause the obfuscation state machine to transition the protected device from an initial obfuscation and non-functional state to a functional state.
-1166-

End

Fig. 10

SYSTEM AND METHOD FOR AUTHENTICATING AND ENABLING AN ELECTRONIC DEVICE IN AN ELECTRONIC SYSTEM

PRIORITY PATENT APPLICATIONS

This is a continuation patent application claiming priority to U.S. non-provisional patent application Ser. No. 15/904,998; filed on Feb. 26, 2018; which is a continuation patent application claiming priority to U.S. non-provisional patent application Ser. No. 15/615,273; filed on Jun. 6, 2017; which is a continuation patent application claiming priority to U.S. non-provisional patent application Ser. No. 14/804,284; filed on Jul. 20, 2015; which is a continuation-in-part patent application claiming priority to U.S. non-provisional patent application Ser. No. 14/716,861; filed on May 19, 2015. This present patent application draws priority from the referenced patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the hardware designs, software, and data as described below and in the drawings that form a part of this document: Copyright 2014-2019 Anvaya Solutions, Inc., All Rights Reserved.

TECHNICAL FIELD

This patent application relates to electronic systems, integrated circuit systems, static electronic devices, mobile electronic devices, electronic hardware and device design, electronic device fabrication, and computer-implemented software, according to various example embodiments, and more specifically to a system and method for authenticating and enabling an electronic device in an electronic system.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density and complexity of integrated circuits has grown, the threat of unauthorized embedded hardware or software components has also escalated.

With the Time to Market (TTM) expectancy shortening in recent years, much of the microelectronics supply chain continues to be outsourced. Trust in the supply chain has been greatly eroded due to many different acts of piracy. This has raised significant questions about the integrity and authenticity of original Intellectual Property (IP) designs embedded inside an Integrated Circuit (IC) or other electronic device.

The following acts of IP piracy have significantly contributed to the erosion of trust in the IC device supply chain: 1) Counterfeiting where a substandard part, rejected part, or a cannibalized part from a previously used and discarded board is remarked as new and re-introduced into the supply chain; and 2) Overbuilding, where the silicon fab houses overproduce blind copies of the ICs in excess of authorization for their own spurious sale. Conventional technologies have been unable to effectively and efficiently provide defenses against these threats.

BRIEF DESCRIPTION OF THE DRAWINGS

The various embodiments are illustrated by way of example, and not by way of limitation, in the figures of the accompanying drawings in which:

FIG. 9 illustrates an example embodiment of the data structures representing the exchanged device specific authentication information;

FIG. 10 is a processing flow chart illustrating an alternative embodiment of a method as described herein.

DETAILED DESCRIPTION

Figure 1:
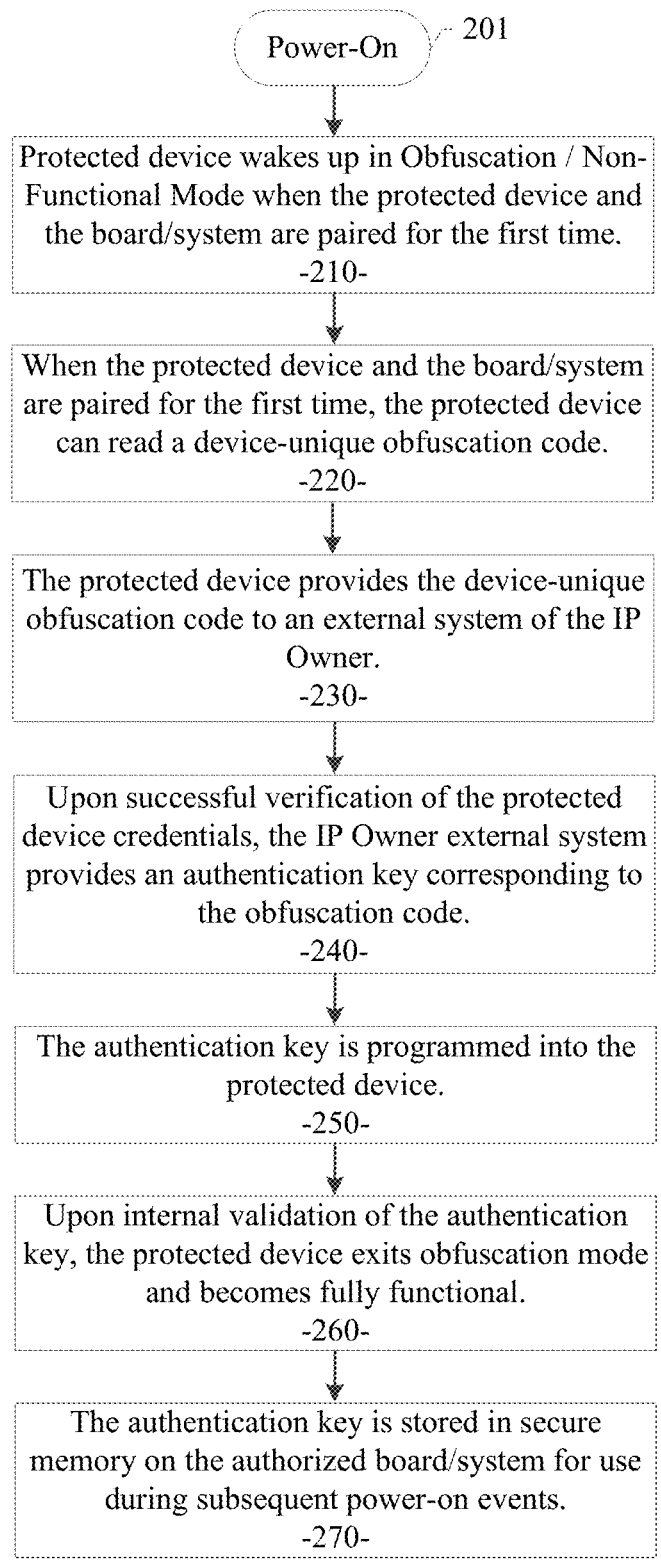
FIG. 1 illustrates a system level operational processing flow of an example embodiment.

In the following detailed description, a reference is made to the accompanying drawings that form a part hereof, and in which are shown, by way of illustration, specific embodiments in which the disclosed subject matter can be practiced. It is understood that other embodiments may be utilized and structural or process changes may be made without departing from the scope of the disclosed subject matter.

According to various example embodiments of the disclosed subject matter as described herein, there is provided a system and method for authenticating and enabling an electronic device in an electronic system. The various embodiments described herein provide an embedded and active obfuscation system, which requires authentication of a protected electronic device after manufacturing and prior to any deployment. This inventive system defeats the incorporation of a counterfeit device or an unauthorized overbuilt part into the supply chain. In a particular described embodiment, every protected electronic device needs a one-time authorization and authentication by the Intellectual Property (IP) owner (or other authorized representative) to function correctly on a new board or other electronic system into which the protected electronic device is embedded. Based on the inventive approach offered by the various embodiments described herein, the following advantages can be realized:

Any electronic device protected by the obfuscation technology disclosed herein will be rendered non-functional after manufacturing and prior to authentication. The protected electronic device will require a one-time per board/system authentication by the IP owner (or other authorized representative) for the device to be operationally functional.

Such an authentication cannot be transferred to a different board/system, which therefore prevents unauthorized reuse of the protected device.

Similarly, a counterfeit part deployed for unauthorized reuse remains functionally dead, as it will not be authenticated by the IP owner (or other authorized representative) for such unauthorized reuse.

The electronic device authentication and enablement system and method described herein eliminates the cumbersome burden of first detecting and then proving a spurious device in play in the supply chain. By use of the obfuscation technology disclosed herein, the producer, fabricator, or the end user of such a spurious device must first contact the IP owner to enable the device to function. By requiring this device authentication prior to use, the possessor of the spurious device is likely to be caught and most likely such an overbuilt/counterfeit device will remain inactive and prevent any damage to the supply chain. The deployment of an overbuilt or counterfeit part into the supply chain itself is thwarted, as such a part is rendered useless until authenticated. The systems and methods of the various embodiments described herein enhance the trustworthiness of the device in play in the supply chain, even as many of the elements in the supply chain remain untrustworthy. This should be compared against the current passive methods where there are no countermeasures to prevent the release of the spurious parts into the supply chain or, their eventual use in an end product (because they slipped through and never got detected). The conventional methods of post-deployment passive detection can therefore result in serious damage, possibly catastrophic damage, once the spurious part is fielded for use.

Referring now to FIG. 1, the diagram illustrates a system level operational processing flow of an example embodiment. The electronic device authentication and enablement system and method described herein is active, always-on, and built into the protected electronic system design. The example embodiment allows for the protected electronic device to wake-up on power-on in a non-functional obfuscated mode when the protected device is paired with a new board/system for the first time (see FIG. 1, block 210). As described in more detail below, the example embodiment generates a device and context unique obfuscation code (see FIG. 1, block 220) and uses the obfuscation code to request a corresponding authentication key from an IP owner or authorized representative of the protected electronic device (see FIG. 1, block 230). The authentication key can be provided to the protected electronic device after the IP owner successfully verifies the credentials of the protected electronic device. The authentication key received by the protected electronic device can be used to restore the protected electronic device to a fully operational mode (see FIG. 1, blocks 240-260).

For an authorized use of a protected device on or with a specific board/system, a one-time handshake (e.g., data communication) between an IP owner of the protected device and a device manufacturer/end-user is required to enable the protected device to be functional. In an example embodiment, a Physically Unclonable Function (PUF) device is used to generate a first portion of an obfuscation code used to authenticate the protected device. Physically Unclonable Function (PUF) devices are well-known physical entities that can be embodied in a physical structure and provide output that is easy to evaluate, but hard to predict. Further, an individual PUF device is typically easy to make, but its results are practically impossible to duplicate, even given the exact manufacturing process that produced it. In this respect, a PUF device is the hardware equivalent of a one-way function.

In an example embodiment, at power-on, each protected electronic device exhibits a unique per device internal n bit value or code, which represents a first portion of an obfuscation code uniquely associated with the protected device in the particular system. The n bit value or code gets created based on the manufacturing or physical characteristics of the protected device. In the example embodiment, the n parameter can be pre-defined, so the length of the first portion of the obfuscation code can be pre-defined. In a particular embodiment, the length of the first portion of the obfuscation code is 84 bits, where n=84. In one example embodiment, this first portion of the obfuscation code can be generated using a delay, or static random access memory (SRAM) based PUF, along with the associated error correcting code logic (ECC). Alternatively, in another example embodiment, the first portion of the obfuscation code can be generated by n bits of fuse, which are randomly programmable per device on the manufacturing floor. It will be apparent to those of ordinary skill in the art in view of the disclosure herein that other equivalent methods can be used to generate a value, unique to a protected device in a particular system, which can represent the first portion of the obfuscation code.

In the example embodiment, a second portion of the obfuscation code can be generated from a combination of one or more other parameters, register contents, data items, or values, including a unique device identifier (ID) associated with the protected device, a unique device manufacturing lot ID, a unique purchase order or contract ID, a unique part ID of the board or system used, a unique time/date stamp of the device manufacture, an ID associated with the geographic location of the manufacture, a unique system context ID, a unique ID of the device manufacturer or IP owner, a digital signature, a watermark, a digital rights management data object or ID, any other device specific information from the manufacturer, and any other design specific information from the IP owner. It will be apparent to those of ordinary skill in the art in view of the disclosure herein that other equivalent values can be used in a combination of values, which can represent the second portion of the obfuscation code.

In the example embodiment, the first portion of the obfuscation code as described above can be combined with the second portion of the obfuscation code as also described above to form a combined obfuscation code, or simply, the obfuscation code. When the protected device and the board/system are paired for the first time, the protected device can read the device-unique obfuscation code (see FIG. 1, block 220). The obfuscation code, as generated by the example embodiment, can represent a unique value associated with the particular protected device in the context of a particular board/system installation and manufacturing parameters. In an example embodiment, the obfuscation code can be a unique 128 bit pattern or value created with the combination component sub-values as described above. In alternative embodiments, the length of the obfuscation code can be lengthened or shortened to conform to a particular implementation. Additionally, the initially generated obfuscation code can be hashed or otherwise processed to produce an obfuscation code with desired characteristics. In an embodiment, the obfuscation code can be stored into secured Basic Input/Output System (BIOS) code, stored into a Tamper Resistant on-board Flash memory device, or stored into a Trusted Platform Module (TPM). In another embodiment, the obfuscation code can be stored into an Obfuscation State Read Only Register. In another embodiment, the obfuscation code is not stored on the board/system, but rather generated in real-time when the board/system is booted up (powered up or restarted).

As described in detail below in connection with a particular example embodiment, obfuscation technology as described herein enables a one-time authentication of the protected device in the context of the particular the board/system installation and manufacturing parameters. When a protected device and a board/system are initially paired and powered up, the example embodiment can perform the one-time authentication process. As an initial part of this process, the obfuscation code is generated as described above. Next, the obfuscation code can be read from the protected device or obfuscation components by an external system. The external system can be a network-connected computer or other separate processing platform. The external system can establish independent data communication with an IP owner or authorized representative associated with the protected device. The external system can send the obfuscation code read from the protected device to a computing system of the IP owner with a request for a device authentication key (see FIG. 1, block 230). Using any of a variety of well-known data processing techniques, the computing system of the IP owner can generate a device-unique authentication key based on the obfuscation code read from the protected device. In a particular example embodiment, the computing system of the IP owner can generate the device-unique authentication key using conventional techniques, such as encryption, steganography, hashing, or other data processing techniques. As a result, a device-unique authentication key based on the device obfuscation code can be generated by the IP owner or authorized representative associated with the protected device. The authentication key can be specific to the protected device in the context of the particular the board/system installation and manufacturing parameters. Thus, the IP owner can control the manufacture and usage of the particular protected device. In an example embodiment, the authentication key can be a 128 bit value derived from the device obfuscation code. In other alternative embodiments, the length of the authentication key can be configured to conform to a particular device/system implementation.

Once the device-unique authentication key is generated by the IP owner or authorized representative as described above, the authentication key can be provided to the protected device and/or obfuscation components in a data communication from the external computing system of the IP owner, after the IP owner successfully verifies the credentials of the protected device (see FIG. 1, block 240). In an example embodiment, the authentication key received from the IP owner can be verified or validated by the protected device to confirm that the received authentication key is authentic. The validated authentication key received from the IP owner can be programmed into the protected device and/or obfuscation components (see FIG. 1, block 250) and used by the obfuscation state machine of the example embodiment to render the protected device functional in the manner described in more detail below (see FIG. 1, block 260). For subsequent retrieval and use of the protected device on the same board/system during subsequent power-on cycles or boot-ups, the returned authentication key from the IP owner is embedded with elements of the first portion of the obfuscation code (derived from the device unique embedded n parameter bits), and then can be stored on the authorized board/system, such as stored into secured BIOS code, a Tamper Resistant on-board flash memory, or a Trusted Platform Module (TPM) and loaded from there (see FIG. 1, block 270). A non-resettable "Valid Authentication Key Programmed" flag can be set to indicate the presence of the validly programmed authentication key. In the example embodiment, the data exchange between the protected device and the IP owner occurs only once, at the very first time the protected device is paired with a specific board/system. In the example embodiment, there is no need for a subsequent authentication query exchange between the protected device and the IP owner, as long as the protected device is paired with the same board/system.

Figure 2:
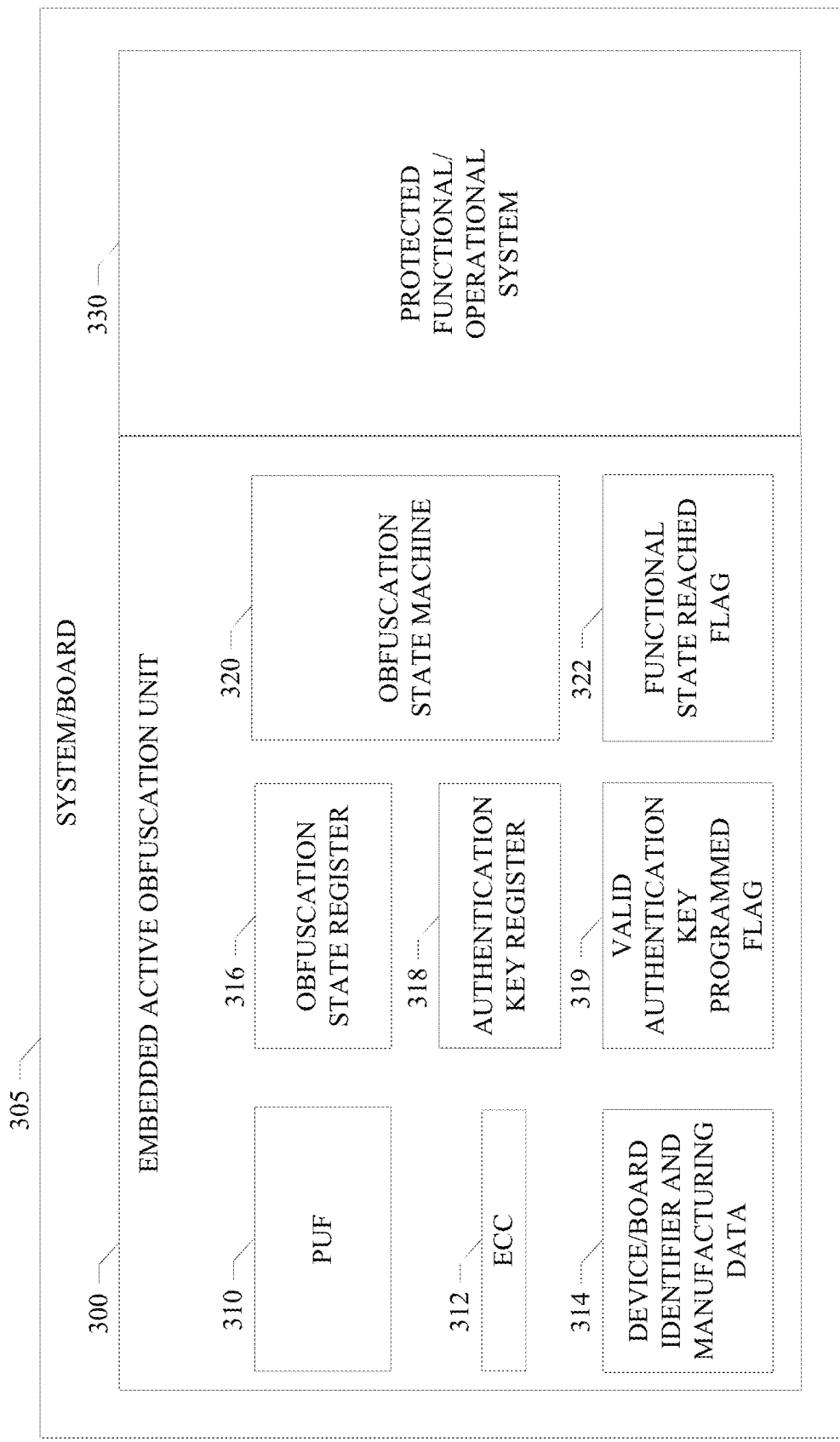
FIG. 2 is an architectural diagram illustrating the functional components provided in the example embodiment.

Referring now to FIG. 2, an architectural diagram illustrates the functional components provided in the example embodiment. In a typical electronic system design, a functional/operational electronic device or system (denoted protected device) 330 for a particular board or system 305 can be developed and defined in a variety of forms. For example, a digital system design can be defined as a Register-Transfer-Level (RTL) abstraction as used in hardware description languages (HDLs) like Verilog and VHDL to create high-level representations of a circuit, from which lower-level representations and ultimately actual wiring can be derived. Design at the RTL level is typical practice in modern digital design. A digital system design, such as functional/operational system 330, can also be defined as a netlist. A netlist describes the connectivity of an electronic design. As such, a single netlist is a list of all the component terminals that should be electrically connected together for the circuit to work. The design of functional/operational system 330 can also be defined in a variety of other forms as well. In any of these design definition forms, the design of functional/operational system 330 can be integrated with or embedded with the design of the embedded active obfuscation unit 300 as described herein in various embodiments. As a result, the embedded active obfuscation unit 300 can be embedded into the design and functionality of the functional/operational system 330 using any of the design definition forms in which the functional/operational system 330 is defined. As a result, the embedded active obfuscation unit 300 and the functional/operational system 330 can be integrated very early in the design process and before the functional/operational system 330 design gets exposed to the threats described above.

Referring still to FIG. 2, the embedded active obfuscation unit 300 of the example embodiment can include a Physically Unclonable Function (PUT) 310 and error correcting code logic (ECC) 312. As described above for an example embodiment, PUF 310 can be used to generate a first portion of the obfuscation code, which is used to authenticate the functional/operational system or protected device 330. In one example embodiment, the first portion of the obfuscation code can be generated using a delay, or SRAM based PUF 310, along with the associated ECC 312.

The embedded active obfuscation unit 300 of the example embodiment can include device/board identifier and manufacturing data component 314. In the example embodiment, a second portion of the obfuscation code can be generated from a combination of one or more other parameters, register contents, data items, or values, retained by the device/board identifier and manufacturing data component 314. These parameters can include a unique device identifier (ID) associated with the protected device, a unique device manufacturing lot ID, a unique purchase order or contract ID, a unique part ID of the board or system used, a unique time/date stamp of the device manufacture, an ID associated with the geographic location of the manufacture, a unique system context ID, a unique ID of the device manufacturer or IP owner, a digital signature, a watermark, a digital rights management data object or ID, any other device specific information from the manufacturer, and any other design specific information from the IP owner.

Referring still to FIG. 2, the embedded active obfuscation unit 300 of the example embodiment can include an obfuscation state register 316 and an authentication key register 318. The obfuscation code, as generated by the example embodiment, can represent a unique value associated with the particular protected device in the context of a particular board/system installation and manufacturing parameters. In an example embodiment, the obfuscation code can be a unique 128 bit pattern or value created with the combination of component sub-values as described above. In one embodiment, the obfuscation code can be stored into obfuscation state register 316 and is regenerated every time at power-on for use. The device-unique authentication key is generated by the IP owner or authorized representative based on the device obfuscation code as described above. The authentication key can be provided to the protected device via an external system. Once the device-unique authentication key is received by the embedded active obfuscation unit 300, the authentication key can be stored in authentication key register 318, and after being combined with the elements of the first part of the obfuscation code, is also updated into the secure BIOS code, or stored in an encrypted fashion either into a Tamper Resistant on-board Flash memory device, or into a Trusted Platform Module (TPM). The stored authentication key can be retrieved and used on the same board/system during subsequent power-on cycles or boot-ups of the protected device 330, and thus the need for query/exchange with the IP owner is obviated.

Referring still to FIG. 2, the embedded active obfuscation unit 300 of the example embodiment can include an obfuscation state machine 320, a valid authentication key programmed flag 319, and a functional state reached flag 322. As described in more detail below, the embedded active obfuscation unit 300 can use the authentication key to cause the obfuscation state machine 320 to transition through a pre-defined sequence of obfuscation (non-functional states) states to reach a functional reset state, which enables the protected device 330 to enter a functional or operational mode. Once this functional or operational mode is reached, the functional state reached flag 322 can be set to indicate the active functional state. This flag enables the protected device 330 to verify that the proper device authentication process has been completed successfully and that the device is in a normal functional mode.

Figure 3:
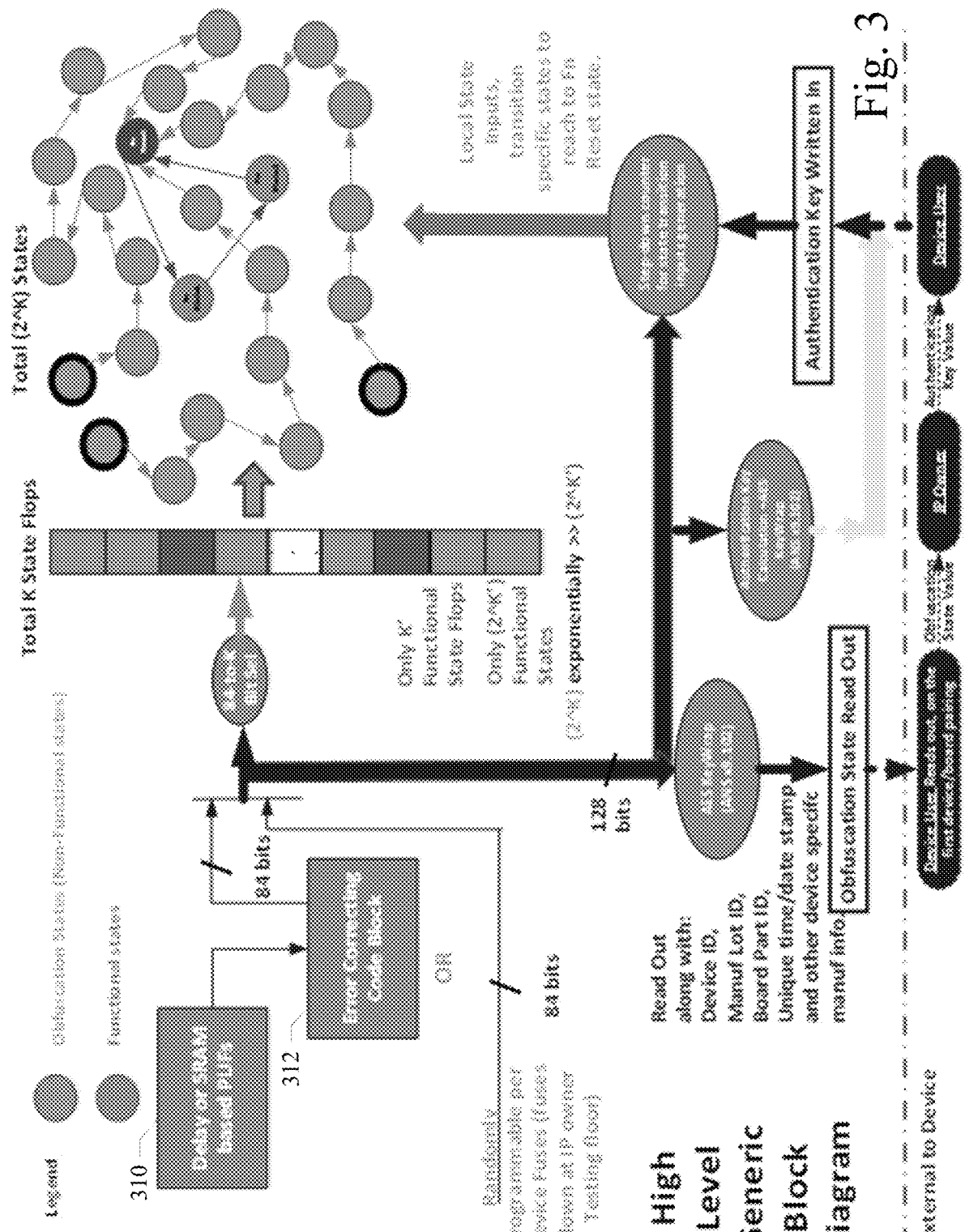
FIG. 3 is a high level block diagram illustrating the functional components and processes provided in the example embodiment.

Referring now to FIG. 3, a high level block diagram illustrates the functional components and processes provided in the example embodiment. As shown, the example embodiment includes the physical unclonable function (PUF) 310 and error correcting code logic (ECC) 312. As described above for an example embodiment, PUF 310 can be used to generate a first portion of the obfuscation code, which is used to authenticate the protected device 330. In one example embodiment, the first portion of the obfuscation code can be generated using a delay, or SRAM based PUF 310, along with the associated ECC 312. In the example embodiment, the PUF 310 can generate a unique but consistent PUF based ID for each electronic device. The unique PUF value can be generated using device manufacturing or physical characteristics, which produce unique internal path delays leading to unique storage values in internal storage elements. The PUF 310 can be a Delay-Arbiter type based device, or can be based on the aggregation of un-initialized wake-up contents of all the storage cells of an on-chip SRAM. Alternatively, in another example embodiment, the first portion of the obfuscation code can be generated by n bits of fuse, which are randomly programmable per device on the manufacturing floor. This alternative embodiment is shown in the bottom left portion of FIG. 3. In the example embodiment shown, 84 fuse wires can be used to program a random value for each protected device, thus providing ($2^{84}$) unique device IDs. For the integrity of this approach, the fuse programming/blowing can be performed at a silicon testing facility within the IP owner's control, using a true entropy seed feeding into a pseudo-random number generator.

As described above, the second portion of the obfuscation code can be generated from a combination of one or more other parameters, register contents, data items, or values, retained by the device/board identifier and manufacturing data component 314. The first portion of the obfuscation code from the PUF/fuse function can be augmented with the second portion of the obfuscation code comprising several other device and board specific manufacturing parameters to create the obfuscation code representing a native wake-up obfuscation state signature of the device. In an example embodiment, the obfuscation code can be a 128 bit value to enable encryption. It will be apparent to those of ordinary skill in the art in view of the disclosure herein that the obfuscation code can be any desired length as needed for particular applications. This obfuscation code can be read out by an external user system on the first pairing of the protected device and the board/system. The obfuscation code may optionally be further encrypted, if required, using standard encryption methods before the obfuscation code is read out.

The information retained by the device/board identifier and manufacturing data component 314 and used for the second portion of the obfuscation code can be used by the IP owner for several reasons. First, the reporting of the unique device ID by the manufacturer/device user, by itself, can be used to update the manufactured silicon count and thus to thwart any overbuilding attempt by a fabrication house. Secondly, once the pairing of the protected device to a board/system is reported, any future pairing of the same device (ID) with another board/system can be further investigated to determine if the new usage is for a remarked counterfeit part usage attempt. Then, such an entry of a counterfeit part into the supply chain can be prevented. A legitimate use of a refurbished part on a new board/system by an authorized supplier, will however, be approved by the IP owner with a new authentication after checking the certified credentials of the authorized supplier.

Referring to the lower portion of FIG. 3, once the obfuscation code is generated as described above, the user of the protected device can use an external system to forward the generated obfuscation code to a system of the IP owner with a request for an authentication key. In the example embodiment, the external system of the protected device user can communicate with the IP owner's system via a generic web-based secure protocol.

Referring to the lower right portion of FIG. 3, in response to the receipt of the obfuscation code and the request for an authentication key from the external system of the protected device user, the IP owner will first verify the device user supplied credentials and establish the trust of the device. Based on the device trust validation, the IP owner can generate and send the corresponding authentication key to the system of the protected device user through the same secure web protocol. In a particular embodiment, the data communication between the protected device user system and the IP owner system can be an encrypted 128 bit data transmission for added security. Upon receipt of the authentication key at the protected device, the authentication key can be programmed into the obfuscation state machine 320 of the embedded active obfuscation unit 300. In the example embodiment, the authentication key serves as the unique key to unlock the functionality of the specific protected device 330. Because the authentication key is derived from the device-unique obfuscation code as described above, the authentication key has a direct relationship with the unique wake-up protocol and the unique obfuscation state of the protected device 330.

Referring to the upper right portion of FIG. 3, the embedded active obfuscation unit 300 can use the previously generated obfuscation code to populate a pre-defined quantity of state elements (denoted state flops in FIG. 3) for obfuscation state machine 320. Each state element can represent an obfuscation (non-functional) state or a functional state of the protected device 330. In the example embodiment, the obfuscation unit 300 can select a portion of the obfuscation code, the length of which corresponds to the pre-defined quantity of state elements. In a particular embodiment shown in FIG. 3, the pre-defined quantity of state elements is $2^k$, which can be a variable number of state elements designed to meet security requirements. As such, the obfuscation unit 300 can select k bits from the obfuscation code to represent the portion of the obfuscation code that corresponds to the $2^k$ state elements as shown in FIG. 3. In a particular embodiment, the k bits can be selected from random bits of the obfuscation code field. In other embodiments, a particular bit selection pattern can be used. In the example embodiment, a pre-defined quantity (kf or k') of the k state bits can correspond to $2^{k'}$ functional state elements of the protected device 330. The remaining quantity (k−kf=ko) of the k state bits can correspond to $2^{ko}$ obfuscation or non-functional state elements of the protected device 330. It is desired that the quantities k and ko be substantially greater than the quantity kf so the functional states can be well hidden among a huge plurality of obfuscation or non-functional states of the protected device 330. In a particular embodiment, the value k can be an order of magnitude greater than the value of kf, so that the quantity of total state elements $2^k$ is three to twelve orders of magnitude greater than $2^{kf}$, the quantity of total functional state elements. In the example embodiment, the pre-defined quantity of functional state elements, $2^{kf}$, can be driven by design.

In the example embodiment, the k bits selected from the obfuscation code by the obfuscation unit 300 can be loaded into the k state flops of the obfuscation state machine 320. In a particular embodiment, the k bits selected from the obfuscation code by the obfuscation unit 300 can be loaded into Boosted State Transition Graph (BSTG) flip-flops (e.g., state elements) of the obfuscation state machine 320. As a result of the k state flops of the obfuscation state machine 320 being loaded with the portion of the obfuscation code as described above, the obfuscation state machine 320 is configured to define a total of $2^k$ states. Given the quantity kf of functional state elements as described above, the obfuscation state machine 320 is also thereby configured to define a total of $2^{kf}$ functional states. As explained above, the quantity of total states $2^k$ is substantially greater than the quantity of functional states $2^{kf}$ in the obfuscation state machine 320.

Because the content of the obfuscation code for a particular system can be controlled by the configuration of the PUF 310 and the other components of the obfuscation code, the content of the obfuscation code can be configured to cause the obfuscation state machine 320 to initially enter an obfuscation or non-functional state. Given the initial obfuscation state, the protected device 330 will start up on power-up or reset in an initial obfuscation state. As such, the protected device 330 is forced to transition through a pre-defined set of obfuscation states before reaching a functional state for normal operation.

As described above, the obfuscation state machine 320 can be configured with $2^k$ total states using k state bits and a substantially fewer quantity of $2^{kf}$ functional states using kf functional state bits. As also described above, the particular configuration of $2^k$ total states and $2^{kf}$ functional states in the obfuscation state machine 320 is derived from the value represented by the obfuscation code. As described above, the obfuscation code represents a unique value associated with the particular protected device 330 in the context of a particular board/system installation and device manufacturing parameters. The obfuscation code for a particular protected system 330 is transferred to and used by the IP owner to generate the authentication key for the particular protected device 330. Because the particular configuration of states and functional states in the obfuscation state machine 320 is derived from the obfuscation code, the authentication key can be mathematically related to the obfuscation code and thus related to the particular configuration of states and functional states in the obfuscation state machine 320. As a result, the authentication key generated by the IP owner can represent a mapping or a particular sequence or pattern of state transitions to cause the obfuscation state machine 320 to transition from the initial obfuscation state, through a plurality of intermediate states, to a functional reset state for the protected system 330. The authentication key can be provided or programmed into the obfuscation state machine 320 of the obfuscation unit 300. Thus, the protected system 330 is unlocked with the authentication key and can transition from the initial obfuscation state to a functional reset state from which the protected system 330 can begin secure, normal operation. In a particular embodiment, the authentication key may also specify the required number c of clock cycles to be used for the protected system 330 to move from the obfuscated state to the functional state. The value of c in a particular embodiment can be a configurable parameter by the IP owner as part of the authentication key. Based on the value of c used in an embodiment, a step up/down counter with a base-line increment/decrement per clock can be created inside the device. This enables the obfuscation state machine 320 to transition across the number of states to reach the eventual functional reset state, all around the required number c of clock cycles.

In the event the total number of obfuscated states $2^{ko}$ is very large (e.g., twelve orders of magnitude larger) compared to the quantity of total functional states $2^{kf}$, the logic cone of input signals leading to the functional reset state will be very large, leading to potential circuit timing delay problems.

This issue can be mitigated by duplicating several functional reset states in place of one functional reset state. All of these functional reset states can be configured to converge and transition to other single or duplicated functional states.

The use of replicated functional states and multiple functional reset states can overcome circuit timing delay problems caused by the use of a large quantity of obfuscated states $2^{ko}$ in various embodiments.

As described above, the obfuscation state machine 320 is configured to use the authentication key to cause transition from the initial obfuscation state, through intermediate states as specified by the number c of clock cycles, to one of potentially multiple functional reset states for the protected system 330. Once the obfuscation state machine 320 reaches a functional reset state, the obfuscation state machine 320 will thereafter transition only within the set of functional states, even after a hardware reset, and will never transition to a non-functional obfuscation state until the next power-on cycle. As a result, the obfuscation unit 300 is configured to securely cause the protected system 330 to reach a functional reset state and normal, secure operation thereafter. Once the protected system 330 transitions to a functional state, a Functional State Reached flag can be set to indicate the completion of the transition from the obfuscation state. This flag is available for other system components to verify that the protected device 330 has been properly authenticated. In a particular embodiment, it will take a minimum of 256 native, protected device clock cycles at the protected device clock speed to put the protected device into a secure, functional operational mode on every power-up cycle.

In an alternative embodiment, each of the state bits in the obfuscation state machine 320 can be configured to define more than two states. Instead of using conventional flip-flops that define only two states: 1) functional, or 2) non-functional, other multi-state devices may be used for the state bits in place of two-state flip-flops to define values corresponding to an arbitrary quantity of states, x, for each state bit. In this embodiment, the use of k state bits would enable the configuration of $x^k$ states in the obfuscation state machine 320. Such an embodiment can substantially increase the quantity of obfuscation states relative to the quantity of functional states and provide an increased level of security.

Authentication Protocol in an Example Embodiment

In an example embodiment described herein, an authentication protocol is provided for use by the IP owner to first verify the genuineness of a protected electronic device and then to authorize the protected device to be functional in a particular electronic system. Until such an authorization is provided, the protected electronic device will remain non-functional when paired with the particular electronic system, such as an electronic board. The authentication protocol as described herein uses a full handshake protocol between a user of the protected electronic device and the IP owner of the protected electronic device to provision the authentication of the protected electronic device in a particular electronic system.

In the example embodiments described herein, an authentication protocol can authenticate a protected electronic device based on indicia of the device's genuineness and indicia of a pairing of the protected electronic device with a particular electronic system. When a protected electronic device is first paired with a particular electronic system, the authentication protocol of an example embodiment can perform several authentication operations to gather and validate the indicia of the device's genuineness and indicia of a pairing of the protected electronic device with a particular electronic system. For example, the authentication protocol of an example embodiment can determine when the protected electronic device is first paired with a particular electronic system. On the first such pairing, information can be recorded to document the new pairing. As a result, subsequent pairings between the same device and system can be identified and a less extensive authentication process can be used.

The authentication protocol of an example embodiment can also check and catch attempts to use a previously authorized protected device on a new spurious electronic system (e.g., board). In this manner, an unauthorized pairing between a previously authorized device and an unauthorized system can be prevented. However, in some cases, it may be appropriate to allow the pairing of a previously authorized device on a new electronic system. For example, a refurbished device may have been previously authorized. It may be appropriate to allow a refurbished and previously authorized device to be paired with a new system. The authentication protocol of an example embodiment can determine if a device is a previously authorized and refurbished device. In this case, the authentication protocol can authorize the pairing between the authorized refurbished device and a new system, once the credentials of the refurbishing house (e.g., the party responsible for the refurbished device) are established and confirmed.

The authentication protocol of an example embodiment can also detect if the electronic device itself is an unauthorized clone, a fab-overbuilt part, or a remarked chop-shop part. On such detections, the IP owner, using the authentication protocol of an example embodiment, can choose to not authenticate such an electronic device and the device will remain functionally inactive if paired with a system/board. In an example embodiment, the authentication protocol can use secure reference designs and validated hardware solutions to compare against the information provided by an electronic device user seeking to obtain authentication of a particular electronic device. These comparisons can be used to identify unauthorized devices and to establish a level of trust with authentic devices. Once trust is established by the authentication subsystem of an example embodiment using the authentication protocol as described herein, an authentication key can be generated by the IP owner or an IP owner key provisioning end-point (e.g., an authentication provisioning node).

As part of the authentication protocol of an example embodiment, the authentication protocol ensures that the protected device provider/user is compelled to connect with the IP owner of the protected device and to obtain device authentication and device/system pairing authentication prior to enabling the functionality of the device in a particular system. As a result, the device provider/user will face increased scrutiny if suspicions are raised about the authenticity of the device. Until such doubts are cleared, the authentication to enable the functioning of the device can be denied, rendering the device non-functional on the particular system/board.

Figure 4:
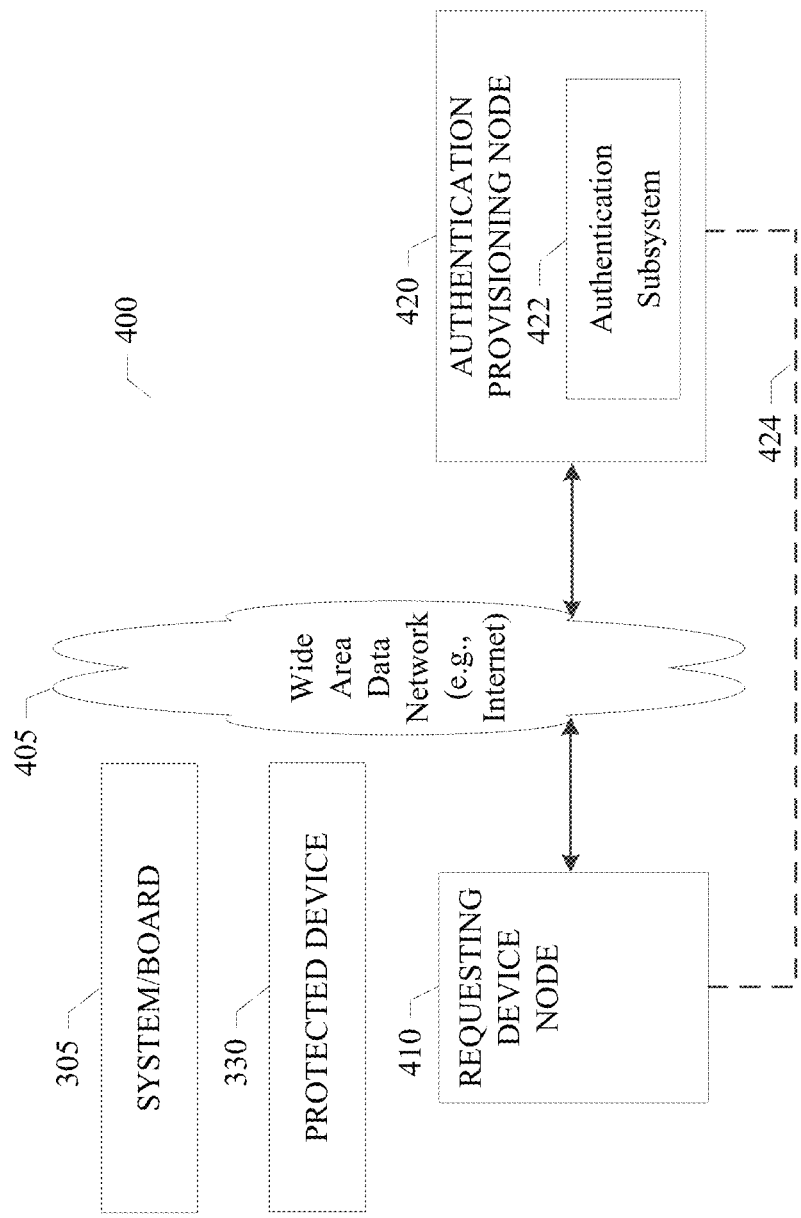
FIG. 4 illustrates the authentication subsystem and authentication environment of an example embodiment.

The authentication protocol of an example embodiment uses a structured information exchange between the provider/user of the protected electronic device and the IP owner corresponding to the protected device. Referring to FIG. 4, a networked authentication environment 400 in an example embodiment is illustrated. The authentication protocol of an example embodiment uses two parties or two computing nodes for the authentication: 1) the device provider/user and a computing system 410 of the device provider/user at a first node (denoted as the requesting device node or RDN 410), and 2) the IP owner and a computing system 420 of the IP owner at a second node (denoted the authentication provisioning node or APN 420). Using conventional secure computing and networking technologies (e.g., the Internet 405), any device provider/user node 410 can connect (e.g., establish a data communication) with the IP owner's authentication provisioning node 420. Once this connection is established, the requesting device node 410 can provide device 330 and system/board 305 details required by the authentication provisioning node 420 to complete the authentication. In some cases, additional device 330 details, if required, can be provided by the device provider/user node 410 in an out-of-band communication 424.

Referring still to FIG. 4, the authentication subsystem 422 of an example embodiment, using the authentication protocol as described herein, can perform trust verification, device authentication, and authentication key provisioning in an automated manner. The IP owner's authentication provisioning node 420 can perform the automated trust verification, device authentication, and authentication key provisioning, based on the information provided by the requesting device node 410. The authentication provisioning node 420 can use the information provided by the requesting device node 410 to determine the grant or denial status of the device authentication key for the requesting device node 410. This method can also provide for subsequent resolution of any issue by mandating the device provider/user's direct and active participation/communication with the IP owner. After an initial successful authentication, the protected device 330 can be authenticated for subsequent power-on cycles and re-boots of the same protected device 330 on the same system/board 305 without performing a full authentication sequence with APN 420 as described above.

The authentication subsystem 422 of the example embodiments provides the assurance that a protected device 330 will never be enabled to function in an unauthorized manner. Such an expectation is very pronounced and highly demanded in mission critical applications, for example, in the realm of the defense industry, Department of Defense (DoD), NASA, and new technology sectors, including the Internet of Things (IoT), automotive applications, aerospace applications, and bio-medical devices. The authentication subsystem 422 described herein provides wide, pro-active coverage against several IP and IC piracy techniques, which are currently detected only by passive and reactive methods after the deployment of the pirated part. The authentication subsystem 422 of the example embodiments provides an opportunity for low cost device authentication based on early detection and prevention of the entry of a spurious part into the supply chain. The authentication protocol requiring a device user to obtain an authentication key from an IP owner defeats most of the current methods used in IP and IC piracy and offers protection against them. The authentication subsystem 422 described herein provides the assurance of the genuineness of the electronic devices in play.

Referring now to FIGS. 5 through 8, an example embodiment illustrates the processing operations performed as part of the authentication protocol by the authentication subsystem 422. As described herein, the authentication protocol of an example embodiment includes a data communication between the protected device provider/user using the protected device on a specific system or board for the very first time and the protected device IP owner. A successful authentication between the protected device provider/user and the device IP owner is required to unlock the obfuscated device and to make the protected device functional on the specific system/board.

As described herein, the authentication protocol of an example embodiment uses two computing nodes for the authentication: 1) the requesting device node 410, and 2) the authentication provisioning node 420. Therefore, the two parties involved in the authentication protocol of the example embodiment are:

The IP Owner who wants to verify if the protected device being used is a genuine one and not a counterfeit/overbuilt part. On successful verification of the protected device and the details of the use provided by the protected device user, the IP owner will issue an authentication key to the protected device user, which is required to unlock the functionality of the protected device. The IP owner may employ an automated authentication provisioning subsystem 422, executing on a secure computing system 420, to perform the authentication process. In another embodiment, this automated authentication process can also be implemented as a secure hardware module to be integrated with other IP owner hardware functionality on the provisioning end.

The Device User, who is in possession of the protected electronic device and needs to unlock the functionality of the protected device for use on a particular system/board. The device user can request a secure data communication connection with the IP owner for protected device authentication. In return, the requesting device node 410 of the device user can be prompted by the authentication provisioning node 420 of the IP owner to provide identification and usage details of the protected device. These identification and usage details can include, for example, the details of the system/board with which the protected device is going to be paired, an identification of the device user, an identification of the protected device, an identification of the system/board, and any certifications or credentials needed to prove the genuineness of the protected electronic device procurement.

Referring still to FIGS. 5 through 8, an example embodiment illustrates the processing operations performed as part of the authentication protocol. The authentication protocol provides a data interaction between the IP owner and the protected device user. This information exchange is done securely using the conventional and established Internet access protocols (e.g., SSL/TLS). However, the data interaction and the information exchanged as part of the authentication protocol is an innovative authentication process. At the conclusion of the information exchange, based on the information provided as part of the authentication protocol, the IP owner node 420 makes a trust evaluation of the protected device user, the protected device itself, and the system/board with which the protected device is to be paired. On successful evaluation of the trust details, the IP owner provides an encrypted authentication key to the protected device user. The protected device user programs this authentication key into the protected device. The pertinent details of the authentication protocol of an example embodiment are described below as illustrated by the processing flow diagrams of FIGS. 5 through 8.

Figure 5:
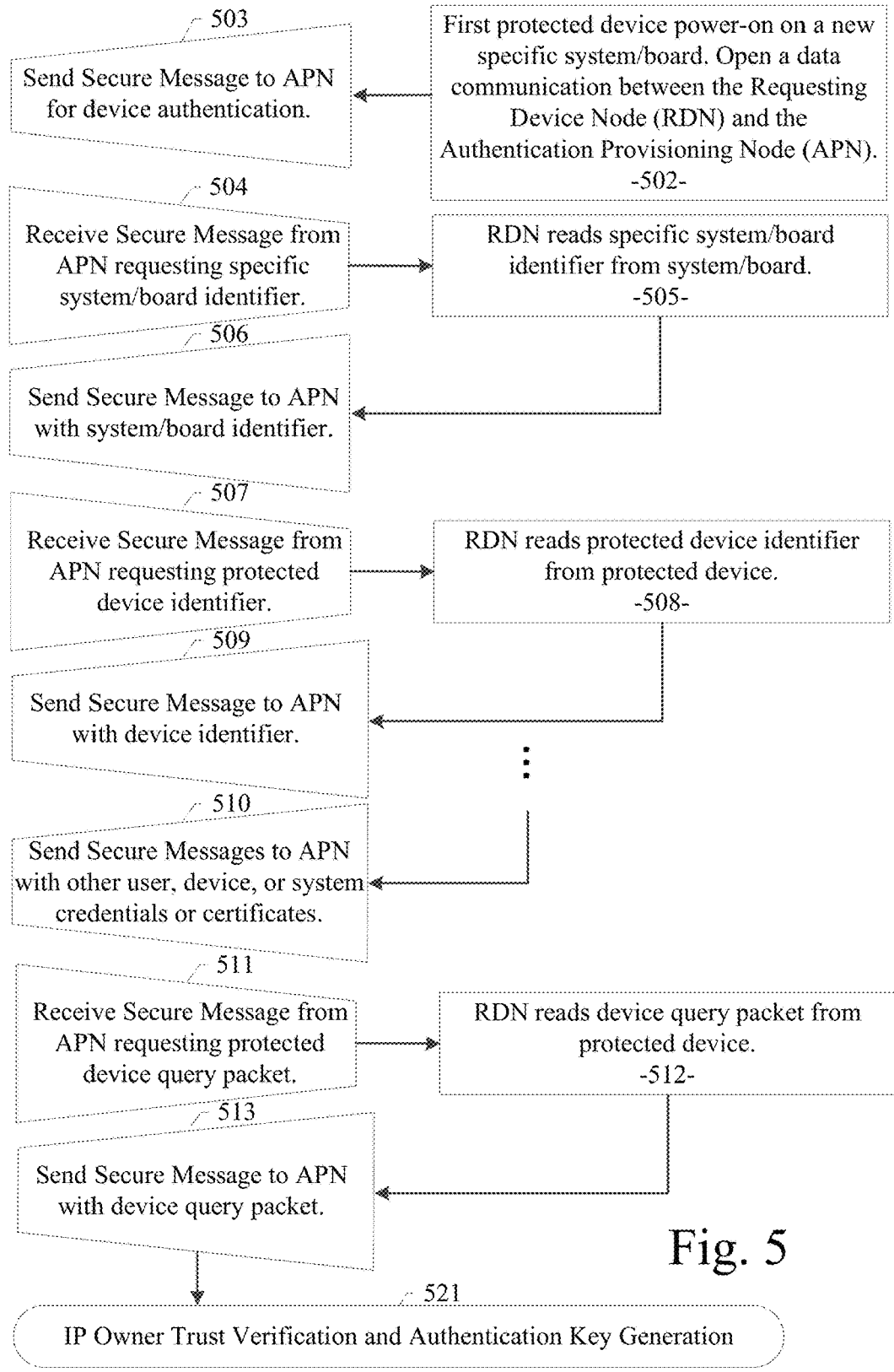
FIGS. 5 through 8 are flowcharts illustrating an example embodiment of the processing operations performed as part of the authentication protocol by the authentication subsystem.

Referring now to FIG. 5 of an example embodiment, a processing flow diagram illustrates the processing performed in the example embodiment for the first-time pairing of the protected device with a specific system or board. In the case of the first-time pairing of the protected device with a specific system or board, the protected device is first powered-on on the new specific system/board. A data communication is opened between the Requesting Device Node (RDN) and the Authentication Provisioning Node (APN) (processing block 502). The RDN sends a secure message to the APN requesting device authentication (processing block 503). The RDN receives a secure message from the APN in response to the authentication request message, requesting a specific system/board identifier (processing block 504). The RDN reads the specific system/board identifier from the system/board (processing block 505). The RDN sends a secure message to the APN with the system/board identifier (processing block 506). The RDN receives a secure message from the APN requesting a protected device identifier (processing block 507). The RDN reads the protected device identifier from the protected device (processing block 508). The RDN sends a secure message to the APN with the device identifier (processing block 509). The RDN can also send additional secure messages to the APN with other user information, device information, or other system credentials or certificates (processing block 510). The RDN receives a secure message from the APN requesting a protected device query packet (processing block 511). The content of the device query packet in an example embodiment is described in more detail below in connection with FIG. 9. The RDN reads and/or assembles the device query packet from the protected device (processing block 512). The RDN sends a secure message to the APN with the device query packet (processing block 513). Processing for the example embodiment continues at the bubble 521 shown in FIG. 6 where the IP owner verifies the trust of the protected device user and the authentication key for the protected device is generated.

Figure 6:
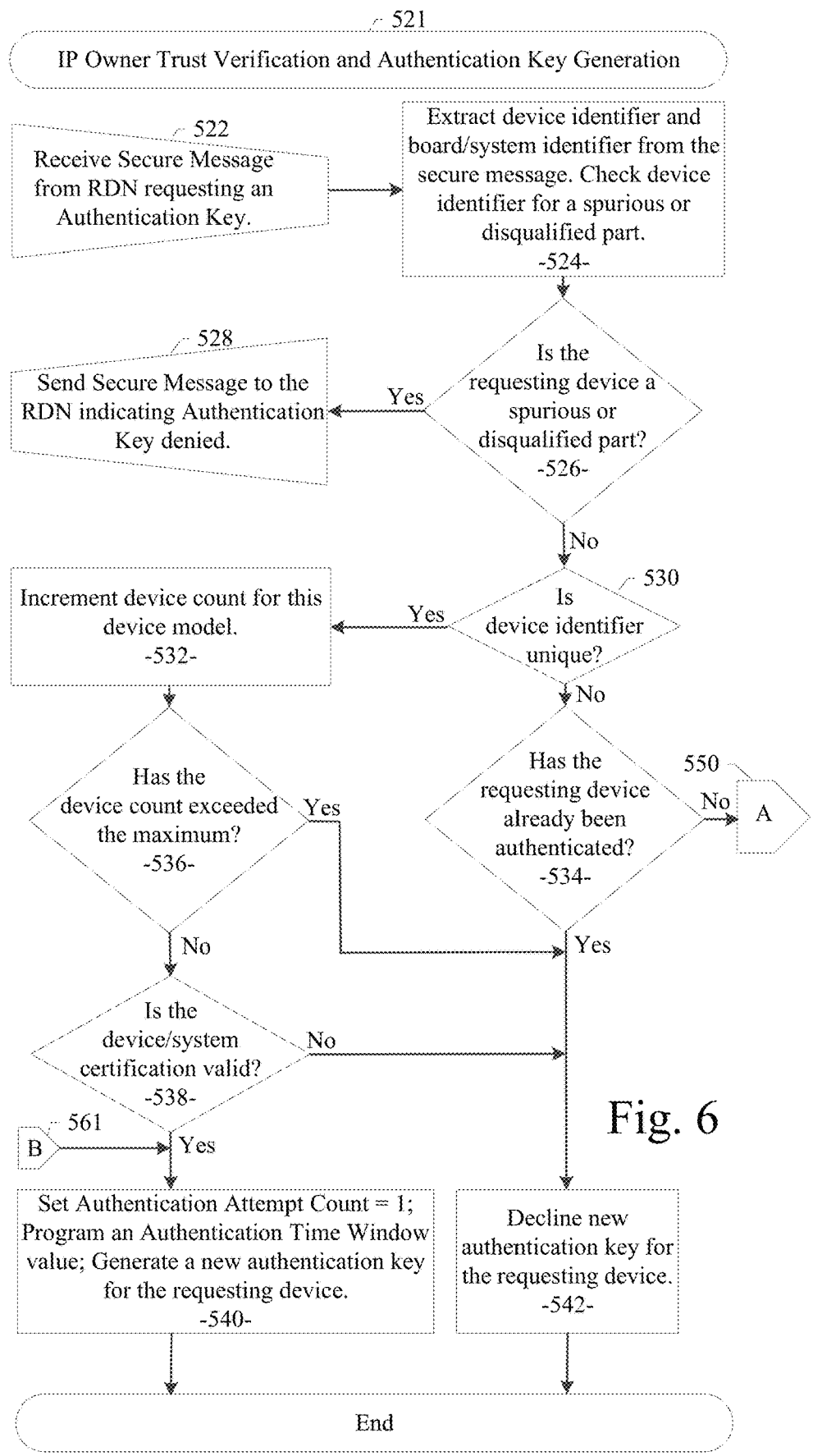
Figure 7:
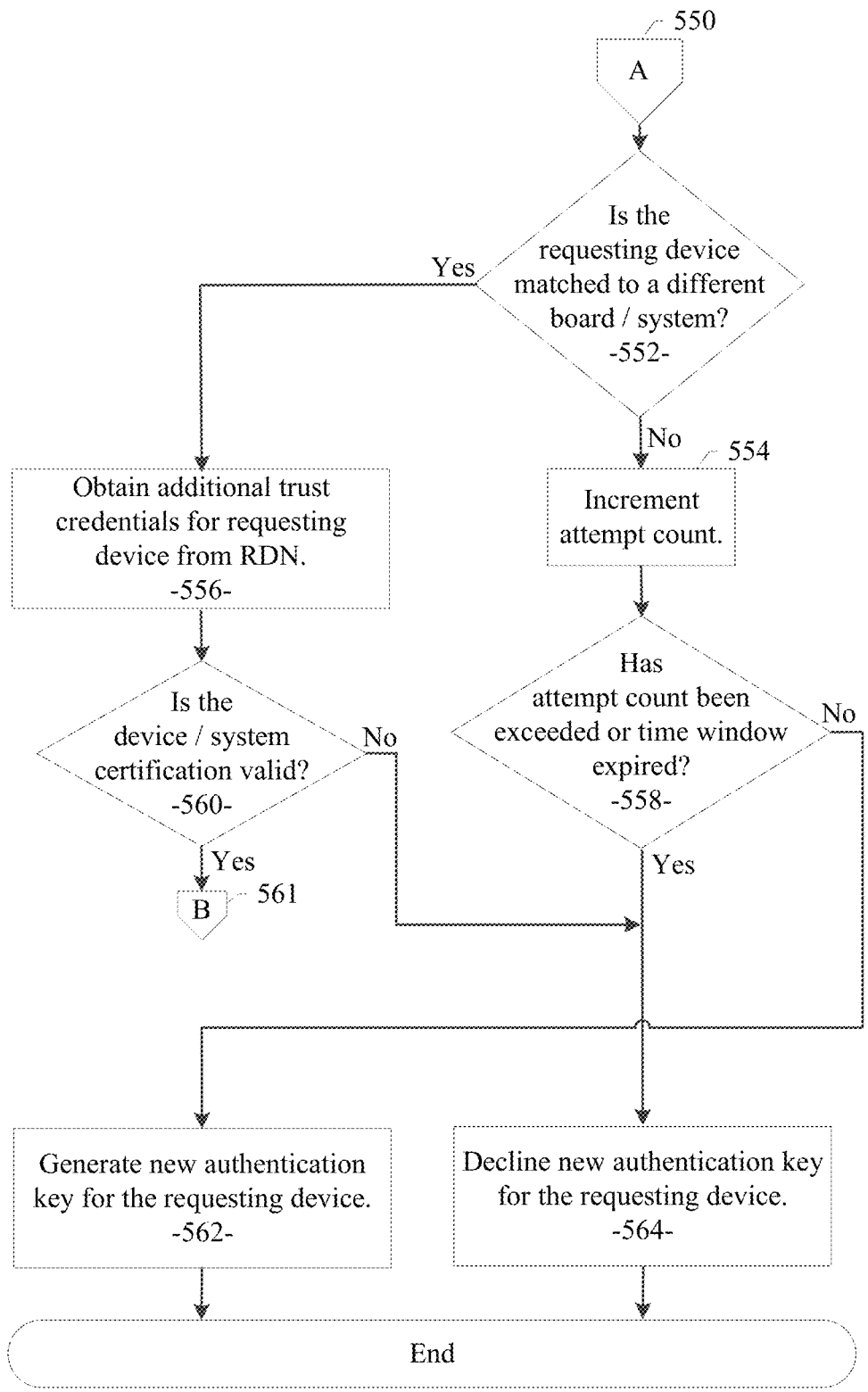

Referring now to FIGS. 6 and 7 of an example embodiment, a processing flow diagram 521 illustrates the processing performed by the APN, in the example embodiment for the protected device user trust verification and the authentication key generation. As shown in FIG. 6, the APN receives a secure message from the RDN requesting an authentication key (processing block 522). The APN can extract a protected device identifier and a board/system identifier from the secure message. The APN can check the device identifier for a spurious or disqualified part (processing block 524). The APN can perform a test at decision block 526 to determine if the requesting device is a spurious or disqualified part based on the device identifier and the board/system identifier. If the test performed at decision block 526 is true (yes), the APN can send a secure message to the RDN indicating that the authentication key request is denied and can terminate further authentication processing (processing block 528), pending direct sideband interaction between the protected device user and the IP owner. If the test performed at decision block 526 is false (no), the APN can transition to decision block 530. At decision block 530, the APN can test if the device identifier of the protected device is unique. If the test performed at decision block 530 is true (yes), the APN can increment a device count for this device model (processing block 532) and processing can transition to decision block 536. If the test performed at decision block 530 is false (no), processing can transition to decision block 534. At decision block 534, the APN can test if the requesting device has already been authenticated. If the test performed at decision block 534 is true (yes), processing can transition to processing block 542. If the test performed at decision block 534 is false (no), the APN can continue processing at the continuation block A 550 shown in FIG. 7 and described below.

When the processing at processing block 532 is complete, processing transitions to decision block 536. A test is performed at decision block 536 to determine if the device count has exceeded a pre-determined maximum value of devices agreed for production. If the test performed at decision block 536 is true (yes), processing can transition to processing block 542. If the test performed at decision block 536 is false (no), processing can transition to decision block 538. At decision block 538, the APN can test if the security certifications and credentials given to it for the protected device and the specific system/board are valid. If the test performed at decision block 538 is true (yes), processing can transition to processing block 540. If the test performed at decision block 538 is false (no), processing can transition to processing block 542.

At processing block 542, the request for a new authentication key for the requesting device is declined and authentication processing terminates. The next step to enable a future authentication process requires direct sideband interaction between the protected device user and the IP owner. At processing block 540, on the APN side, for this device identifier, first an Authentication Attempt Count is initialized to a value of one, and also an Authentication Time Window value is programmed. Next, the request for a new authentication key for the requesting device is granted and the new authentication key for the requesting device user is generated. Processing then terminates at the End bubble shown in FIG. 6.

If the test performed at decision block 534 shown in FIG. 6 is false (no), the requesting device identifier is not unique and the requesting device has not been previously authenticated. In this case, processing continues at the continuation block A 550 shown in FIG. 7 and described next. Referring now to FIG. 7, processing continues for the protected device user trust verification and the authentication key generation in an example embodiment. A test is performed at decision block 552 to determine if the requesting device has been previously matched to a different board or system. If the test performed at decision block 552 is true (yes), processing can transition to processing block 556. If the test performed at decision block 552 is false (no), processing can transition to processing block 554. At processing block 554, an attempt count is incremented to keep track of the number of times authentication for the protected device has been attempted. At processing block 556, additional trust credentials for the requesting device are requested from the RDN. When the processing at processing block 554 is complete, a test is performed at decision block 558 to determine if the authentication attempt count has been exceeded or the authentication time window has expired. If the test performed at decision block 558 is true (yes), processing can transition to processing block 564. If the test performed at decision block 558 is false (no), processing can transition to processing block 562.

When the processing at processing block 556 is complete, a test is performed at decision block 560 to determine if the requesting device security certifications and credentials are valid. If the test performed at decision block 560 is true (yes), processing can transition via the continuation block B 561 to processing block 540 as shown in FIG. 6 and described above. If the test performed at decision block 560 is false (no), processing can transition to processing block 564 as shown in FIG. 7.

At processing block 564, the request for a new authentication key for the requesting device is declined and authentication processing terminates. The next step to enable a future authentication process requires direct sideband interaction between the protected device user and the IP owner. At processing block 562, the request for a new authentication key for the requesting device is granted and the new authentication key for the requesting device user is generated. Processing then terminates at the End bubble shown in FIG. 7.

Figure 8:
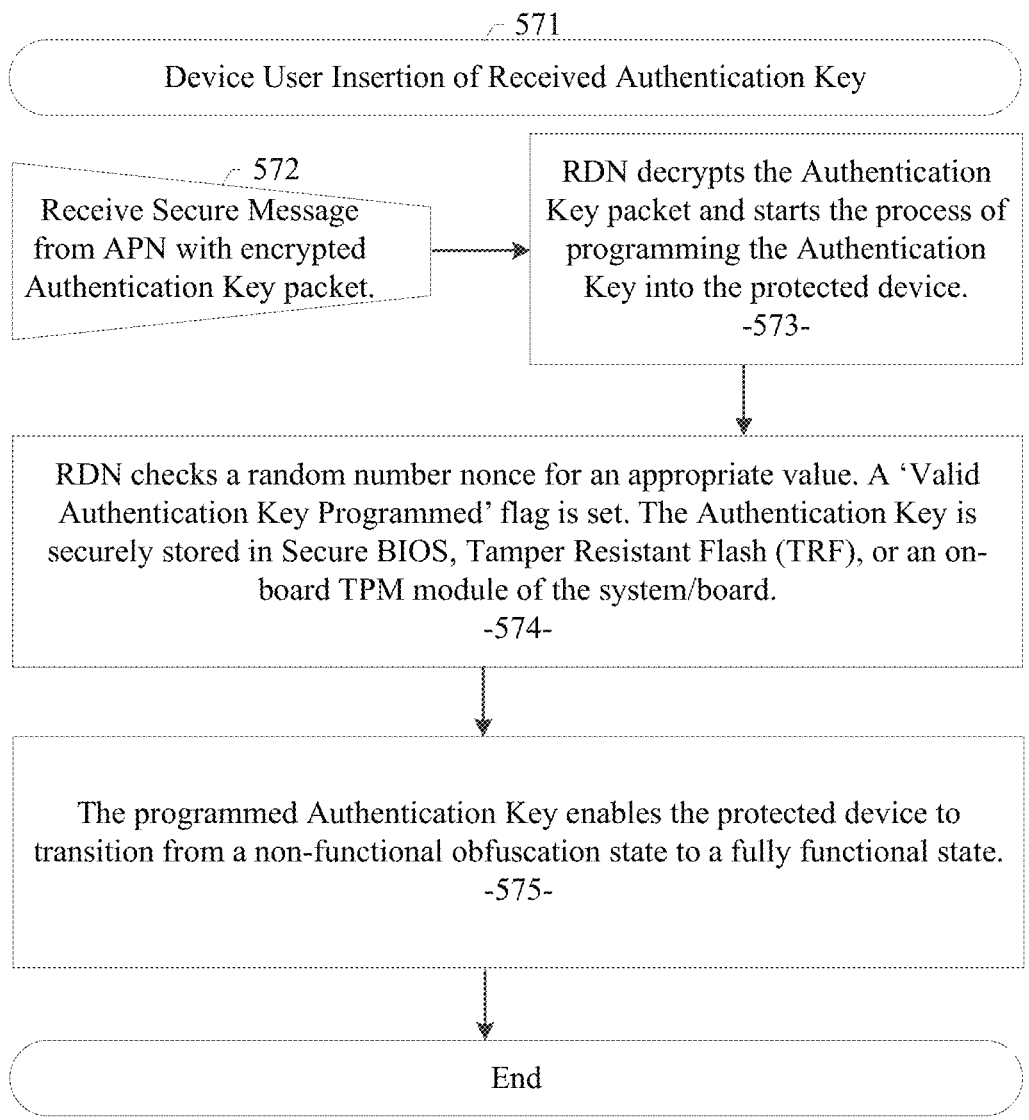

Referring now to FIG. 8 of an example embodiment, a processing flow diagram illustrates the processing performed in the example embodiment for validation and insertion of the authentication key into the protected device. The insertion or programming of a valid authentication key into the protected device will unlock and enable the functionality of the protected device on the particular system/board. In processing block 572, the RDN receives a secure message from the APN with the encrypted authentication key packet. The details of the authentication key packet are described below in connection with FIG. 9. The RDN receives the encrypted authentication key packet after successfully satisfying all of the verification and credentialing checks described above in connection with FIGS. 5 through 7. Upon receipt of the encrypted authentication key packet from the APN, the RDN can decrypt the encrypted authentication key packet and start the process of programming the authentication key into the protected device (processing block 573). The details of programming the authentication key into the obfuscation state machine of the protected device are described above in connection with FIG. 3. As part of the process of starting to program the authentication key into the protected device, the device hardware can unwrap the authentication key received from the APN and check to see if the individual fields of the authentication key are within the acceptable limits. If the authentication key information is not acceptable, a message will be presented to the protected device user conveying information related to the authentication failure (e.g., a hardware error code can be output, which is interpreted by the secure device driver as a message for the protected device user, the message including the reasons for the failure). Upon authentication key failure, the protected device will continue to remain in the obfuscated, non-functional state. The protected device user may make the necessary corrections and initiate another authentication request to the IP owner/APN.

If the authentication key information received from the APN is acceptable, the internal protected device hardware can set a flag to indicate that a successful authentication of the protected device by the IP owner is achieved. This flag called, "Valid Authentication Key Programmed" is set internally on the control event of successful authentication key verification by the protected device. This flag will not be reset on any kind of protected device hardware or software reset. This flag will remain persistent across power-downs/ups and boots of the system/board paired with the protected device. This persistence is achieved by storing the flag value externally to the protected device as part of an encrypted image in secure BIOS, a Tamper Resistance Flash (TRF) device, or in an existing on-board/system Trusted Platform Module (TPM) (processing block 574). In processing block 574, the validated authentication key can also be modified by the protected device hardware by replacing the unique nonce timestamp with a safe, acceptable pattern. In one embodiment this replaced portion can be bit values from randomly chosen bit locations of the device's first portion of the obfuscation code (derived from the device unique embedded n parameter bits). Other embodiments can choose other approaches to modify the Authentication key value before secure storage. The rest of the authentication key can remain the same. The modified authentication key can also be stored externally to the protected device in an encrypted fashion. For subsequent power-on and re-boot cycles, the protected device can first fetch the "Valid Authentication Key Programmed" flag from external secure storage. If the protected device determines that the fetched "Valid Authentication Key Programmed" flag is asserted (true), the protected device can then fetch the securely stored authentication key as well. As a result, the protected device can proceed without the need for an extensive authentication exchange with the IP owner for subsequent power-on and re-boot cycles, once the authentication is successfully achieved on the very first pairing of the protected device with a new system/board. After a successful authentication of the protected device as paired with the particular system/board as described above, the protected device internal hardware can perform a procedure to unlock the obfuscated, non-functional protected device and transition the protected device to a non-obfuscated, fully functional state (processing block 575). The details of programming the authentication key into the obfuscation state machine of the protected device are described above in connection with FIG. 3. The action of programming the valid authentication key into the obfuscation state machine of the protected device serves to unlock the obfuscated, non-functional protected device and transition the protected device to a non-obfuscated, fully functional state. Processing then terminates at the End bubble shown in FIG. 8.

Referring now to FIG. 9, in an example embodiment, the data structures of the exchanged device specific authentication information are illustrated. In the example embodiment, there are two basic device authentication data packets, the authentication query packet and the authentication response data packet, which are associated with the protected device user/the protected device, and the IP owner, respectively. In the example embodiment, the authentication query data packet is denoted the device query packet. In the example embodiment, the authentication response data packet is denoted the authentication key data packet. The specifics of these data packets are described in more detail below for the example embodiment. These data packets are securely exchanged between the RDN and the APN in the authentication protocol as described above.

Device Query Packet: In the example embodiment, this is the final packet provided by the RDN and is an encrypted 128 bits, which the RDN will provide to the APN. Prior to this packet transfer as described above, the RDN will transmit to the APN, using existing secure Internet Protocols (SSL/TLS), the individual components of the device and system identifying information including, a protected device identifier (ID), system/board ID, and other trust credentials, which the IP owner requires from the RDN. The encrypted device query packet is created by the protected device. In the example embodiment, the device query packet is assembled, as shown in FIG. 9, with a 96 bit nonce stamp (e.g., value) to defeat packet replay attacks. The nonce value can be generated through a combination of protected device embedded real random number generators and pseudo-random number generators along with device-based entropies for seeding. The 31 bit obfuscation state is generated by the protected device, and based on the unique device ID-based value of the protected device. The 31 bit obfuscation state value corresponds to the unique per device power-on non-functional state in which the protected device wakes up on power-up or reboot. The least significant bit (LSB) of the device query packet is a one bit "Authentication Done" indicator, which is persistent across re-boot and power-on cycles of the protected device on the same system/board. The "Authentication Done" indicator is a protected device internal value, which keeps track of the protected device having been successfully authenticated before.

Authentication Key Packet: In the example embodiment, this packet represents the encrypted authentication key generated by the APN on the successful outcome of the protected device/protected device user trust verification performed by the APN as part of the authentication protocol as described above. The authentication key packet has the same 96 bit nonce value to match with the device query packet, and thus defeats replay attack attempts. The APN can generate the N bit authorization code value as shown in FIG. 9, which the protected device checks to see if the value is indeed an acceptable value. The (32-N) bit value field, as shown in FIG. 9, defines the specific number of cycles close to which the protected device should always take to converge from its non-functional obfuscated state to its first functional state. This value is a performance metric, and in the absence of a given value, a default number of cycles is assumed by the protected device to achieve its convergence to a non-obfuscated, fully functional state. It will be apparent to those of ordinary skill in the art in view of the disclosure herein that additional values or different arrangements of data in the device query packet and the authentication key packet can be implemented within the scope of the embodiments described herein.

Referring now to FIG. 10, a processing flow diagram illustrates an example embodiment of a method 1150 as described herein. The method 1150 of the example embodiment includes: providing a protected device (processing block 1160); generating a device query packet including data representing one or more identifiers of the protected device and a particular paired system (processing block 1162); obtaining an authentication key based on the device query data packet from an authentication provisioning node using an external data communication (processing block 1164); and programming an obfuscation state machine of the particular paired system with the authentication key to cause the obfuscation state machine to transition the protected device from an initial non-functional obfuscation state to a functional state (processing block 1166).

It will be apparent to those of ordinary skill in the art in view of the disclosure herein that the method steps or processing operations described above may be performed in alternative sequences. For example, another alternative embodiment may use the obfuscation code to request an authentication key from an authorized representative in a first external communication and then may use the board/system identifier data to request the authentication key from the authorized representative in a second external communication.

Figure 11:
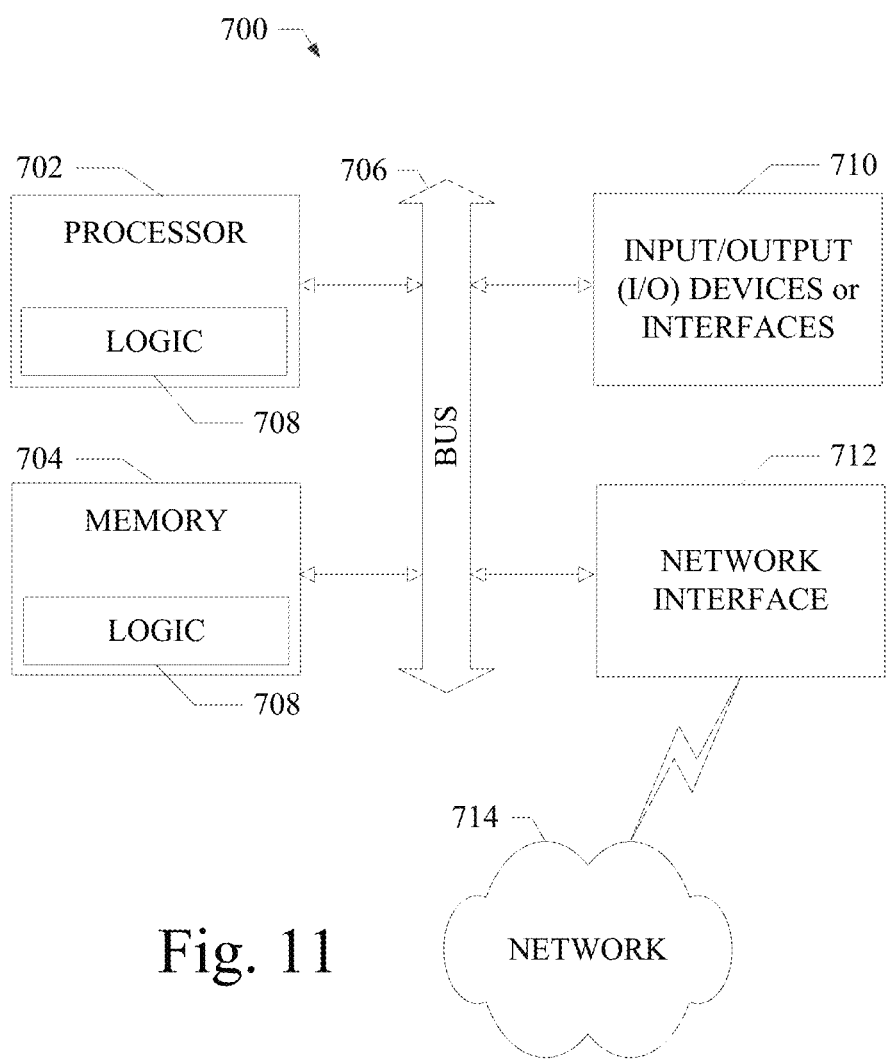
FIG. 11 shows a diagrammatic representation of a machine in the example form of a computing and/or communication system within which a set of instructions when executed and/or processing logic when activated may cause the machine to perform any one or more of the methodologies described and/or claimed herein.

FIG. 11 shows a diagrammatic representation of a machine in the example form of an electronic device, such as a computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip [SoC], general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a display device or network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. This also includes Tamper Resistant Flash (TRF) and Trusted Platform Modules (TPM). The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware or firmware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

With general reference to notations and nomenclature used herein, the description presented herein may be disclosed in terms of program procedures executed on a computer or a network of computers. These procedural descriptions and representations may be used by those of ordinary skill in the art to convey their work to others of ordinary skill in the art.

A procedure is generally conceived to be a self-consistent sequence of operations performed on electrical, magnetic, or optical signals capable of being stored, transferred, combined, compared, and otherwise manipulated. These signals may be referred to as bits, values, elements, symbols, characters, terms, numbers, or the like. It should be noted, however, that all of these and similar terms are to be associated with the appropriate physical quantities and are merely convenient labels applied to those quantities. Further, the manipulations performed are often referred to in terms such as adding or comparing, which operations may be executed by one or more machines. Useful machines for performing operations of various embodiments may include general-purpose digital computers or similar devices. Various embodiments also relate to apparatus or systems for performing these operations. This apparatus may be specially constructed for a purpose, or it may include a general-purpose computer as selectively activated or reconfigured by a computer program stored in the computer. The procedures presented herein are not inherently related to a particular computer or other apparatus. Various general-purpose machines may be used with programs written in accordance with teachings herein, or it may prove convenient to construct more specialized apparatus to perform methods described herein.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A requesting device node, executing on a computing system, the requesting device node comprising:
   a device query data packet generator, executing on the computing system, to generate a device query packet including data representing one or more identifiers of a protected device and a particular paired system; and
   an obfuscation state machine of the particular paired system configured with a pre-defined quantity of state elements, a pre-defined quantity of the state elements being functional state elements, the obfuscation state machine being programmed with an authentication key to cause the obfuscation state machine to transition the protected device from an initial obfuscation state to a functional state, the protected device being further configured to obtain the authentication key from secure data storage if a flag is asserted.

2. The requesting device node of claim 1 wherein the device query packet includes an obfuscation state value and a nonce value.

3. The requesting device node of claim 1 wherein the authentication key includes an authentication code and a nonce value.

4. The requesting device node of claim 1 wherein the requesting device node and an authentication provisioning node being in data communication via a secure internet connection.

5. The requesting device node of claim 1 wherein the protected device being further configured to check a 'Valid Authentication Key Programmed' flag and to obtain the authentication key from the secure data storage instead of from an authentication provisioning node if the 'Valid Authentication Key Programmed' flag is asserted.

6. An authentication provisioning node, executing on a computing system, the authentication provisioning node comprising:
   a device query data packet receiver, executing on the computing system, to receive from a requesting device node a device query packet including data representing one or more identifiers of a protected device; and
   an authentication key generator, executing on the computing system, to generate an authentication key based on the device query packet, the authentication key being configured to cause an obfuscation state machine to transition the protected device from an initial obfuscation state to a functional state, the authentication key generator being further configured to check the one or more identifiers of the protected device for potential status as a spurious or disqualified part.

7. The authentication provisioning node of claim 6 wherein the device query packet includes an obfuscation state value and a nonce value.

8. The authentication provisioning node of claim 6 wherein the authentication key includes an authentication code and a nonce value.

9. The authentication provisioning node of claim 6 wherein the requesting device node and an authentication provisioning node being in data communication via a secure internet connection.

10. A method comprising:
    generating a device query packet including data representing one or more identifiers of a protected device and a particular paired system;
    obtaining an authentication key based on the device query packet; and
    programming an obfuscation state machine of the particular paired system with the authentication key to cause the obfuscation state machine to transition the protected device from an initial obfuscation state to a functional state, the protected device being further configured to obtain the authentication key from secure data storage if a flag is asserted.

11. The method of claim 10 wherein the device query packet includes an obfuscation state value and a nonce value.

12. The method of claim 10 wherein the authentication key includes an authentication code and a nonce value.

13. The method of claim 10 including providing an external data communication being a secure internet connection.

14. The method of claim 10 including checking a 'Valid Authentication Key Programmed' flag and obtaining the authentication key from the secure data storage instead of from an authentication provisioning node if the 'Valid Authentication Key Programmed' flag is asserted.

15. A method comprising:
    receiving from a requesting device node a device query packet including data representing one or more identifiers of a protected device; and generating an authentication key based on the device query packet, the authentication key being configured to cause an obfuscation state machine to transition the protected device from an initial obfuscation state to a functional state, and checking the one or more identifiers of the protected device for potential status as a spurious or disqualified part.

16. The method of claim 15 wherein the device query packet includes an obfuscation state value and a nonce value.

17. The method of claim 15 wherein the authentication key includes an authentication code and a nonce value.

18. The method of claim 15 including providing an external data communication being a secure internet connection.

* * * * *